United States Patent [19]

Kobayashi et al.

[11] Patent Number: 5,040,166
[45] Date of Patent: Aug. 13, 1991

[54] MAGNETO-OPTICAL RECORDING MEDIUM HAVING A REFLECTIVE FILM OF AG AND MN OR AG, MN AND SN

[75] Inventors: Masanobu Kobayashi; Yoshinori Maeno; Kayoko Oishi, all of Tokyo, Japan

[73] Assignee: Oki Electric Industry Co., Ltd., Tokyo, Japan

[21] Appl. No.: 423,033

[22] Filed: Oct. 18, 1989

[30] Foreign Application Priority Data

Oct. 21, 1988 [JP] Japan ................................. 63-265626
May 11, 1989 [JP] Japan ................................. 1-118330

[51] Int. Cl.$^5$ .......................... G11B 13/04; G11B 7/24
[52] U.S. Cl. ...................................... 369/275.2; 369/13; 369/288; 360/131; 428/694
[58] Field of Search ...................... 369/13, 275.4, 288, 369/284, 286; 360/131, 135, 59, 114; 428/694; 365/900, 122; 346/135.1, 76 L; 430/945, 495

[56] References Cited

U.S. PATENT DOCUMENTS

| | | | |
|---|---|---|---|
| 4,390,600 | 6/1983 | Ohta et al. | 428/694 X |
| 4,461,807 | 7/1984 | Mori et al. | 346/135.1 X |
| 4,649,519 | 3/1987 | Sun et al. | 365/122 |
| 4,657,814 | 4/1987 | Asai et al. | 428/900 X |
| 4,680,742 | 7/1987 | Yamada et al. | 369/13 |
| 4,709,363 | 11/1987 | Dirks et al. | 369/288 X |
| 4,725,502 | 2/1988 | Kiyomiya et al. | 428/900 X |

OTHER PUBLICATIONS

Proceedings, SPIE vol. 382, pp. 252-259, Jan. 1983.
"Hikarijiki Disk" by Nobutake Imamura, published on 2/20/86 by Kiki Triceps, pp. 427-433 and its translation of English.

Primary Examiner—Stuart S. Levy
Assistant Examiner—Hoa Nguyen
Attorney, Agent, or Firm—Wenderoth, Lind & Ponack

[57] ABSTRACT

The present invention relates to magneto-optical recording medium. The recording medium comprises a magnetic film and a reflective film both provided on a substrate. The reflective film comprises silver (Ag) and manganese (Mn) or silver (Ag), manganese (Mn) and tin (Sn). The magneto-optical recording medium gives excellent CN ratio and recording sensitivity.

21 Claims, 9 Drawing Sheets

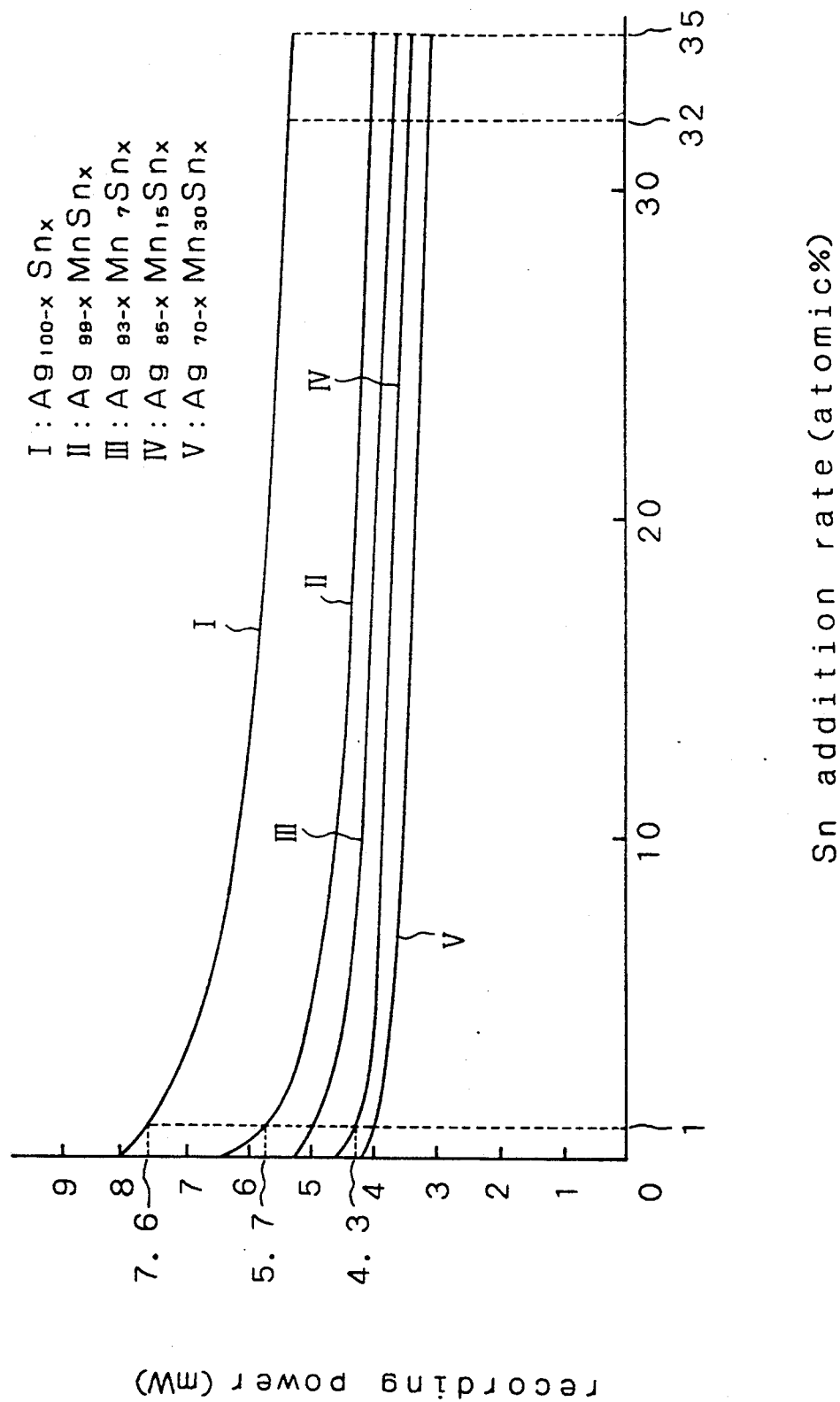
FIG_5(a)

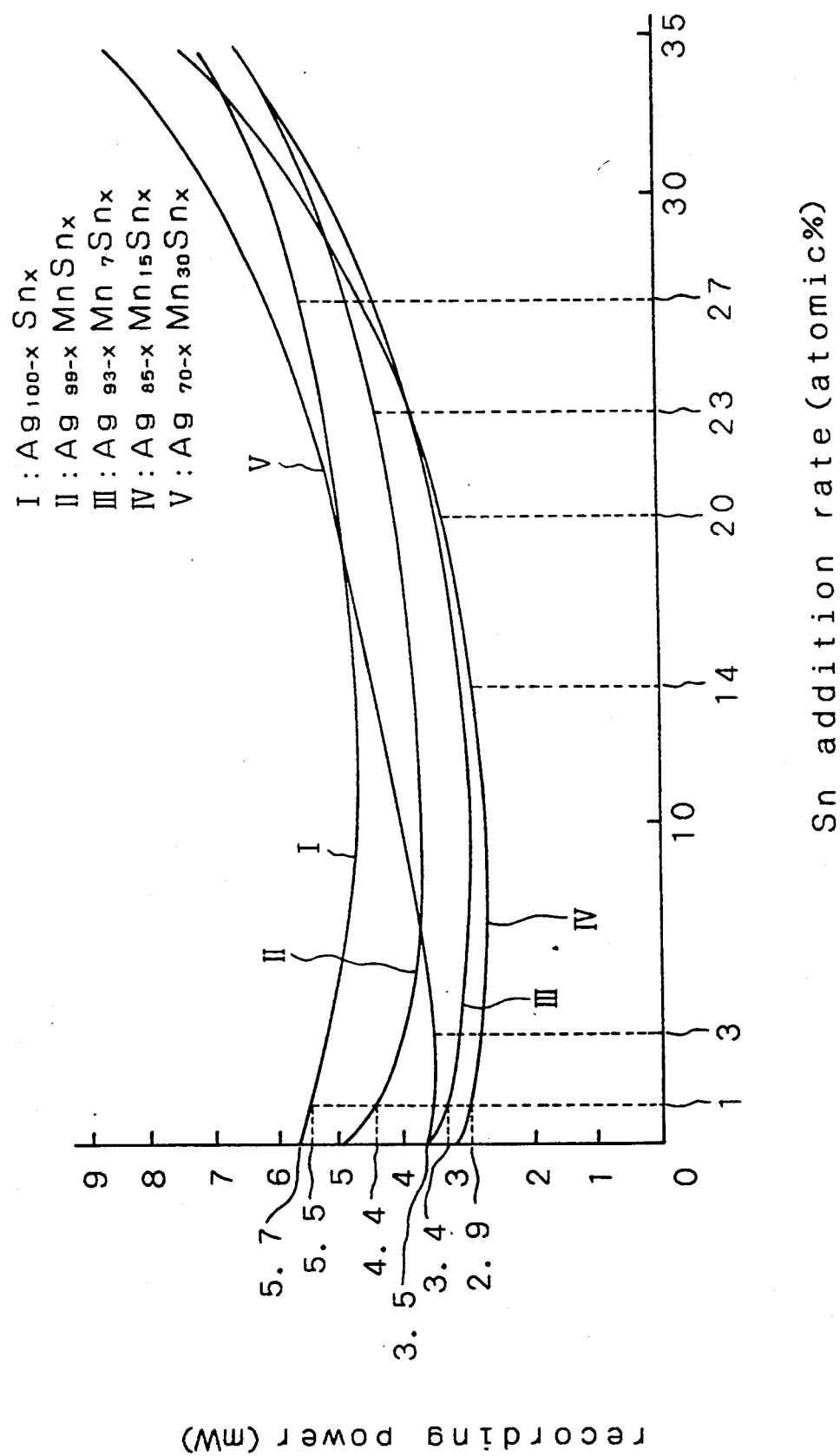
FIG_5 (b)

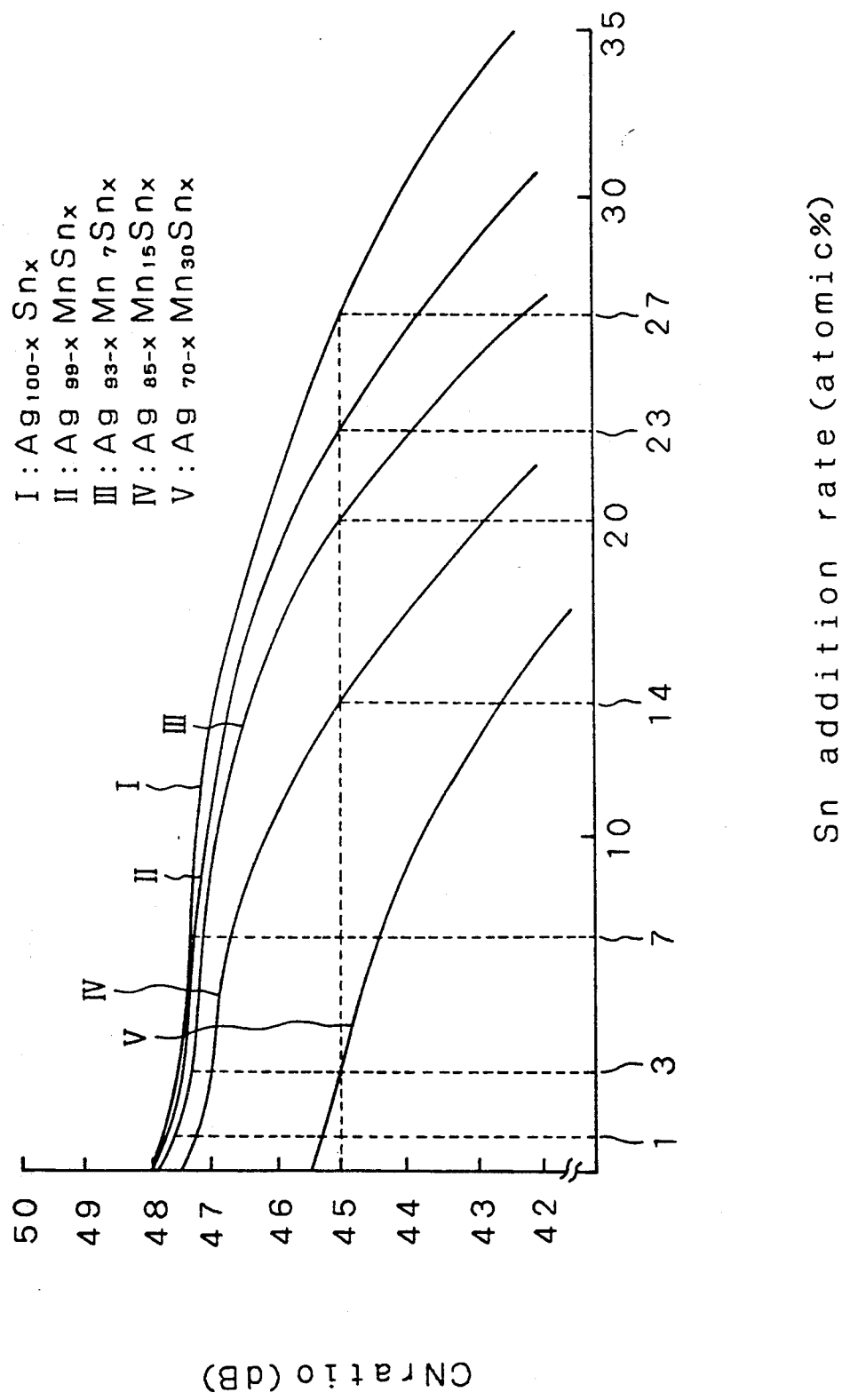

FIG_7
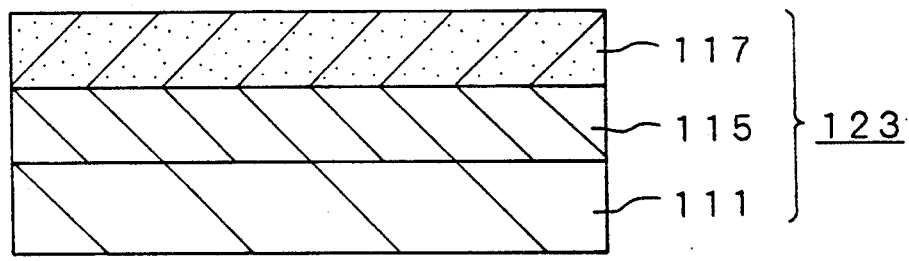

MAGNETO-OPTICAL RECORDING MEDIUM HAVING A REFLECTIVE FILM OF AG AND MN OR AG, MN AND SN

BACKGROUND OF THE INVENTION

1. Field of the Invention

The present invention relates to a magneto-optical recording medium, and particularly to a magneto-optical recording medium having such a reflective film as to give excellent CN ratio (carrier-to-noise ratio) and recording sensitivity.

2. Prior Art

Magneto-optical recording media (hereinafter sometimes referred to in brief as "recording media") as high-density recording media having a magnetic film adapted to rewriting are under active investigation and development.

Among magneto-optical recording media constituting the magnetic films of such recording media, amorphous alloys of a rare earth metal with a transition metal (hereinafter sometimes referred to as "RE-TM alloys") have been most progressed in studies and most put into practical use since they are formed into a perpendicular anisotropy film with direction of magnetization oriented pependicularly to the surface of the film, have a large coercive force of several KOe, and are capable of being relatively easily formed into a film by a deposition technique such as sputtering, or vacuum evaporation and deposition.

Since recording media produced using an RE-TM alloy have a perpendicular anisotropy film as the magnetic film thereof, they have excellent features of being capable of recording information up to an extremely high density of $10^8$ (bits/cm$^2$) and being, in principle, capable of undergoing infinite repetition of erasing and rewriting information.

However, a magnetic film made of an RF-TM alloy is defective in that it has a poor corrosion resistance [see "Hikarijiki Disk" complied under the general editorship of Nobutake Imamura and published by K. K. Triceps, p. 427 (Literature I)] and exhibits only a little magneto-optical effect (Kerr effect).

Thus, there are known structures of recording media which comprise a magnetic film as mentioned above and a reflective film provided on the side of the magnetic film opposite the reading side thereof and/or protective films provided so as to sandwich the magnetic film to increase the apparent Kerr rotation by utilizing the refraction or reflection of light (see the above-mentioned Literature I, p.119).

The above-mentioned conventional magneto-optical recording media will now be described while referring to the accompanying drawings.

FIG. 1(a) is a schematic cross-sectional view of an example of the conventional recording media, which is illustrative of the structure thereof.

As will be understood from FIG. 1(a), a protective film 13a, a magnetic film 15, a protective film 13b and a reflective film 17 are formed in this order on the upper surface of a substrate 11 to produce a recording medium 19.

The substrate 11 is made of a material which is transparent at the wavelength of a light to be used in writing in or reading from the recording media 19. Examples of such a material include polycarbonate resins, glass, and epoxy resins.

The protective films 13a and 13b are formed by deposition of SiO, SiO$_2$, AlN, Si$_3$N$_4$, AlSiN, AlSiON, or other protective film material.

The magnetic film 15 is made of an RE-TM alloy as mentioned above, known examples of which include Tb-Fe alloys, Tb-Co alloys, Tb-Fe-Co alloys, and the like.

Aluminum (Al) is most widely used as the material of the reflective film 17, other examples of which include gold (Au), copper (Cu), and titanium (Ti).

As another known recording medium having a reflective film 17 as mentioned above, a recording medium 21 as shown FIG. 1(b) is produced by forming on the upper surface of a substrate 11, a protective film 13a, a magnetic film 15, a reflective film 17 and a protective film 13b in this order.

Information writing on such a recording medium is carried out according to the so-called thermomagnetic writing system in which the recording medium to which an external magnetic field is applied is irradiated with a laser beam having a fined spot diameter of about 1 μm in such a direction that the beam advances from the substrate 11 to the magnetic film 15. More specifically, the magnetic film 15 locally heated with the above-mentioned laser beam is lowered in coercive force in the heated area thereof, wherein information is immediately written by the external magnetic field carrying information for recording. Information writing may also be carried out by means of a pit length and/or an interval between pits created by a laser beam as mentioned above.

As can be understood from the foregoing description, the recording sensitivity of a magneto-optical recording medium is greatly affected by the heat retaining properties in the magnetic film thereof and the degree of multipath reflection.

Accordingly, when the reflective film is viewed from the foregoing point of view, the reflective film is required to be made of a material having not only such a low thermal conductivity as to suppress heat dissipation at the time of information writing but also such a high reflection factor as to give efficient multipath reflection at the time of information reading.

As described above, when silver (Ag), among known materials of reflective films, is used to form a reflective film, a CN ratio of about 48 dB can be attained because Ag has a high reflection factor. On the other hand, however, the high thermal conductivity of Ag makes it necessary to use a high energy as a recording power corresponding to the output of a laser beam for use in information writing in order to make up for large heat dissipation from a magnetic film.

In view of the foregoing problem of the prior art, an object of the present invention is to provide a magneto-optical recording medium which not only has a practical readout sensitivity, but also permits information writing therein to be carried out with a smaller recording power than a magneto-optical recording medium having a reflective film made of silver alone.

SUMMARY OF THE INVENTION

The above-mentioned object can be attained by providing magneto-optical recording media as described below.

In accordance with a first embodiment of the present invention, there is provided a magneto-optical recording medium comprising a magnetic film and a reflective film both provided on a substrate, wherein the above-mentioned reflective film comprises silver (Ag) and manganese (Mn).

In the first embodiment of the present invention, the amount of manganese (Mn) based on the total amount of silver (Ag) and manganese (Mn) (hereinafter referred to as the "Mn addition rate") in the reflective film is preferably in the range of 2 atomic % to 32 atomic %.

In accordance with a second embodiment of the present invention, there is provided a magneto-optical recording medium comprising a magnetic film and a reflective film both provided on a substrate, wherein the above-mentioned reflective film comprises silver (Ag), manganese (Mn) and tin (Sn).

In the second embodiment of the present invention, the composition of the reflective film comprising silver (Ag), manganese (Mn) and tin (Sn) is preferably such that:

(1) the amount of tin (Sn) based on the total amount of silver (Ag), manganese (Mn) and tin (Sn) (hereinafter referred to as the "Sn additional rate") is in the range of 1 atomic % to 23 atomic % when the amount of manganese (Mn) based on the total amount of silver (Ag), manganese (Mn) and tin (Sn) (hereinafter referred to as the "Mn addition rate") is 1 atomic %;

(2) the Sn addition rate is in the range of 1 atomic % to 20 atomic % when the Mn addition rate is 7 atomic %;

(3) the Sn addition rate is in the range of 1 atomic % to 14 atomic % when the Mn addition rate is 15 atomic %.

According to the first embodiment of the present invention, the magneto-optical recording medium has a reflective film comprising silver (Ag) capable of providing a high CN ratio, and manganese (Mn) added thereto. The addition of Mn to Ag in the reflective film enables the recording power of the recording medium to be reduced as compared with a reflective film made of Ag alone.

According to the second embodiment of the present invention, the magneto-optical recording medium has a reflective film comprising silver (Ag) capable of providing a high CN ratio, and a combination of manganese (Mn) and tin (Sn) added thereto. The addition of Mn and Sn to Ag enables the recording power of the recording medium to be reduced as compared with a reflective film made of Ag alone.

BRIEF DESCRIPTION OF THE DRAWINGS

The foregoing and other objects and advantages of the present invention will be better understood by reference to the following description, taken in connection with the accompanying drawings, in which:

FIGS. 5(a) and 5(b) are diagrams each showing correlation curves with the ordinate and the abscissa representing the recording power and the Sn addition rate in an Ag-Mn-Sn reflective film system, respectively, which illustrate Example 2 in accordance with the second embodiment of the present invention;

FIGS. 6(a) and 6(b) are diagrams each showing correlation curves with the ordinate and the abscissa representing the CN ratio and the Sn addition rate in the Ag-Mn-Sn reflective film system, respectively, which also illustrates Example 2 in accordance with the second embodiment of the present invention; and FIG. 7 is a schematic cross-sectional view of another example of the layer structure of the magneto-optical recording medium of the present invention.

PREFERRED EMBODIMENTS OF THE INVENTION

Examples according to the present invention will now be described while referring to the accompanying drawings While the following description of Examples will be made while mentioning preferable examples of numerical values and other conditions falling within the scope of the present invention, it will be understood to those skilled in the art that those numerical values and other conditions should not be construed as limiting the scope of the present invention because they are mere exemplified.

Example 1 is concerned with a combination of silver (Ag) with manganese (Mn) to form a reflective film in accordance with the first embodiment of the present invention, while Example 2 is concerned with a combination of silver (Ag) with manganese (Mn) and tin (Sn) to form a reflective film in accordance with the second embodiment of the present invention.

EXAMPLE 1

In Example 1, a plurality of magneto-optical recording media respectively having reflective films formed of silver (Ag) and manganese (Mn) at varied Mn addition rates and at varied thicknesses were examined with respect to recording power and CN ratio.

Production of Magneto-optical Recording media

Figure 2:
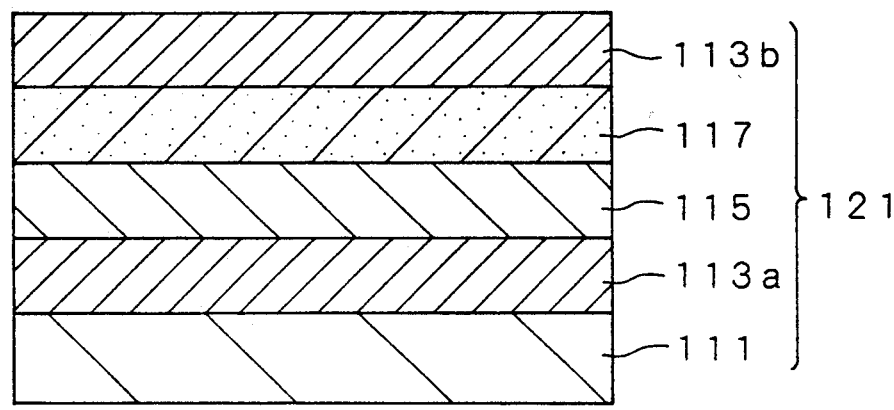
FIGS. 2(a) and 2(b) are schematic cross-sectional views of examples of the layer structure of the magneto-optical recording medium of the present invention.
Figure 2:
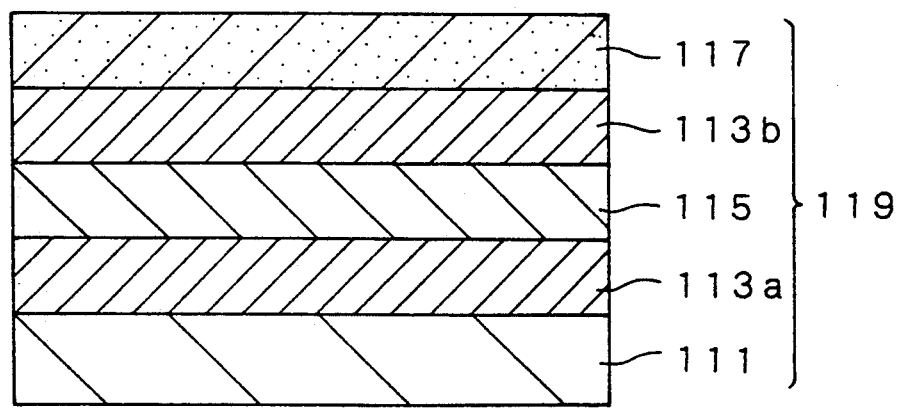

First, the procedure of producing a magneto-optical recording medium as a sample to be examined will be described while referring to FIG. 2(a).

Figure 1:
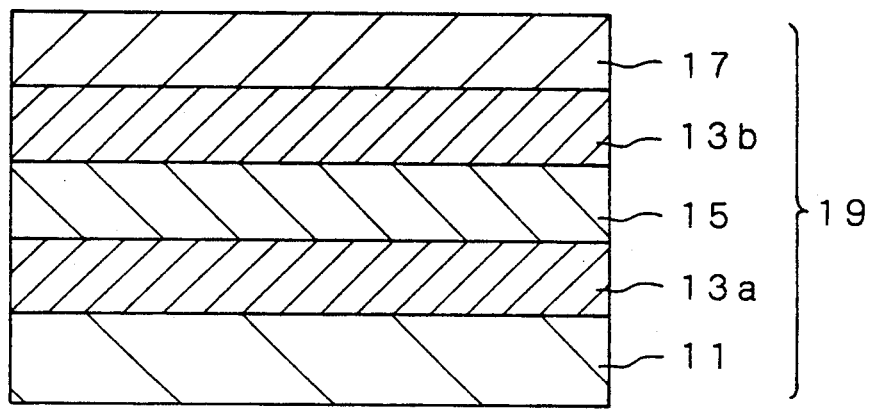
FIGS. 1(a) and 1(b) are schematic cross-sectional views of structures of magneto-optical recording media according to conventional techniques.
Figure 1:
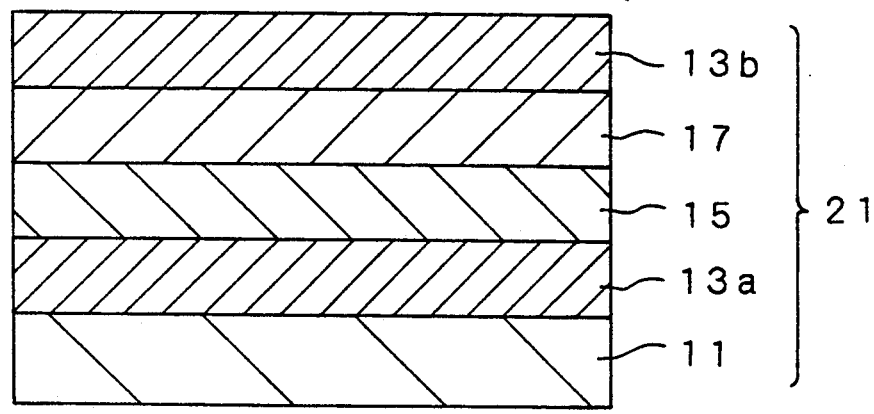

In this Example, magneto-optical recording media having the same laminated structure as the aforementioned structure shown in FIG. 1(b) were produced. A protective film 113a, a magnetic film 115, a reflective film 117 and a protective film 113b were sequentially formed on the upper surface of a substrate 111 to produce a magneto-optical recording medium 121 as a sample to be examined.

The procedure will be described more specifically. First, the protective film 113a having a thickness of 700 Å and made of silicon aluminum nitride (AlSiN) was first deposited on the upper surface of the substrate 111 made of a polycarbonate by a magnetron sputtering method. The deposition conditions included a supplied electric power of about 500W and an argon gas pressure of 3 mTorr.

Subsequently, the magnetic film 115 having a thickness of about 300 Å was deposited on the surface of the protective film 113a using a target composed of terbium, iron and cobalt at a ratio of 22:70:8 in terms of the number of atoms under the same deposition conditions as described above according to the same deposition method as described above.

Next, the reflective film 117 made of Ag and Mn was deposited on the surface of the magnetic film 115. The Mn addition rate in the reflective film 117 was varied in the range of 0 to 45 atomic %, while the thickness of the reflective film 117 was varied to be 200 Å, 300 Å or 400 Å.

The reflective film deposition conditions included a supplied electric power of about 500W and an argon gas pressure of 3 mTorr just as described above. The Mn addition rate was varied by changing the areal ratio of a target of Mn alone to a target of Ag alone in terms of the areas of the surface thereof subjected to sputtering when the two targets were mutually overlapped.

Thereafter, the protective film 113b made of AlSiN and having the same thickness as that of the protective film 113a was deposited on the surface of the above-mentioned reflective film 117 under the same deposition conditions as in the deposition of the protective film 113a. Thus, a plurality of magneto-optical recording media 121 having respective reflective films 17 differing in composition (Mn addition rate) and thickness were produced.

Procedures of Measuring Characteristics of Sample

A description will be made of the procedures of measuring the recording power and the CN ratio of each sample produced in the foregoing manner.

In the measurement of the recording power of every sample, the recording conditions were standardized to include the use of a light having a wavelength of 830 nm, a rotation of 1,800 r.p.m., a duty of 33%, and a recording frequency of 3.7 MHz.

The measurement of the CN ratio of each sample was made under reading conditions, including a reading power of 1.0 mW and a band width of 30 KHz, after information writing in the sample under the above-mentioned recording conditions with a recording power adapted to the sample.

Results of Measurement of Characteristics of Samples

The relationships of the Mn addition rate in an Ag-Mn reflective film system with the recording power and the CN ratio as measured under the foregoing conditions will now be described while referring to FIGS. 3 and 4.

Figure 3:
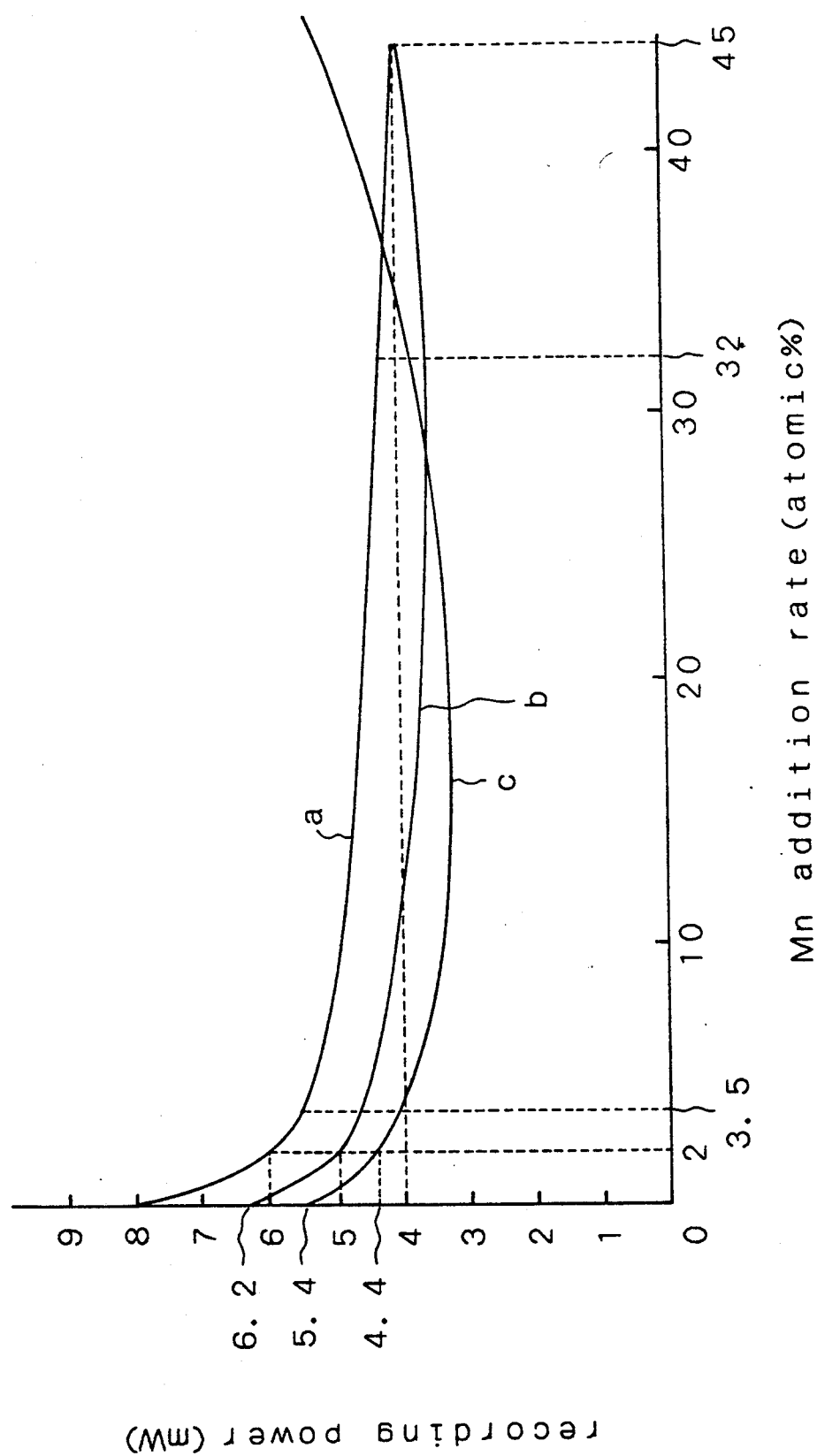
FIG. 3 is a diagram showing correlation curves with the ordinate and the abscissa representing the recording power and the Mn addition rate in an Ag-Mn reflective film system, respectively, which illustrates Example 1 in accordance with the first embodiment of the present invention.

FIG. 3 is a diagram showing correlation curves with the ordinate and the abscissa representing the recording power (mW) and the Mn addition rate (atomic %) in the Ag-Mn reflective film systems, respectively, which is illustrative of the relationship between the Mn addition rate and the recording power. In FIG. 3, the curve a is concerned with samples having a reflective film of 400 Å in thickness, the curve b with samples having a reflective film of 300 Å in thickness, and the curve c with samples having a reflective film of 200 Å in thickness.

As can be understood from FIG. 3, in the case of samples having a reflective film made of Ag alone (Mn addition rate:0 atomic %), the recording power varied depending on the thickness of the reflective film to be about 8.0 mW for a reflective film thickness of 400 Å, about 6.2 mW for a reflective film thickness of 300 Å, and about 5.4 mW for a reflective film thickness of 200 Å.

In contrast, the recording power was decreased as the Mn addition rate was increased. For example, in the case of samples produced at a Mn addition rate of 2 atomic % (corresponding to a reflective film having a composition represented by the formula: $Ag_{98}Mn_2$), the recording power could be decreased to be about 6.0 mW for a reflective film thickness of 400 Å, about 5.0 mW for a reflective film thickness of 300 Å, and about 4.4. mW for a reflective film thickness of 200 Å.

As can bee understood from the curve in the case of the samples having a reflective film of 400 Å in thickness, the recording power tended to be decreased as the Mn addition rate was increased from 2 atomic % as mentioned above. A recording power of about 4.0 mW was obtained for a sample produced at an Mn addition rate of 45 atomic %. However, no substantial decrease in the recording power could not be secured even when the Mn addition rate was increased to more than 45 atomic %.

By contrast, it will be understood, in the case of the samples having a reflective film of 300 Å in thickness (curve b) as well as the samples having a reflective film of 200 Å in thickness (curve c), that the recording power, which once showed a decreasing tendency with increasing Mn addition rate, turned out to be increased as the Mn addition rate was further increased.

Next, a description will be made of relationship between the CN ratio and the Mn addition rate as regards the recording media of Example 1 while referring to FIG. 4.

Figure 4:
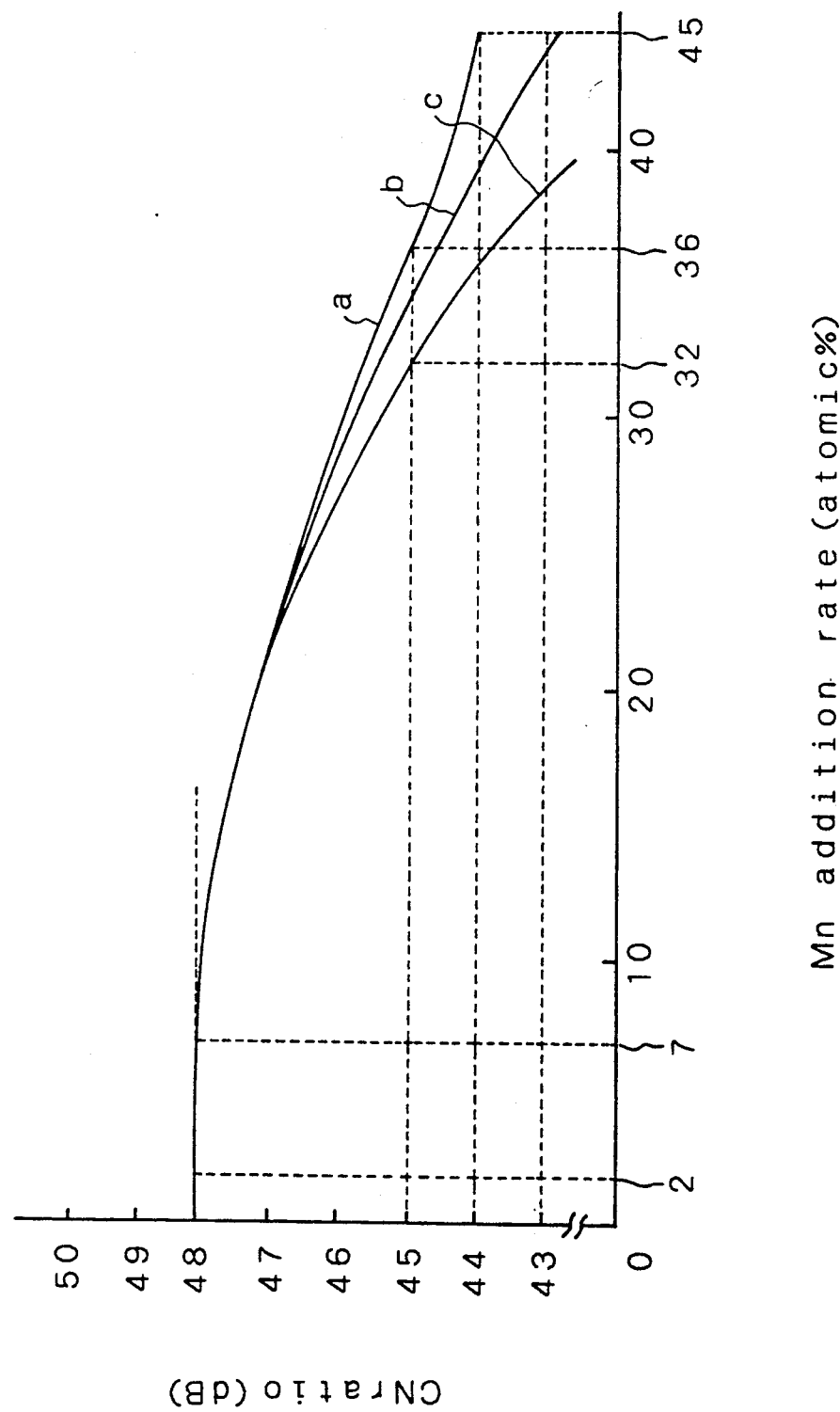
FIG. 4 is a diagram showing correlation curves with the ordinate and the abscissa representing the CN ratio and the Mn addition rate in the Ag-Mn reflective film system, respectively, which also illustrates Example 1 in accordance with the first embodiment of the present invention.

FIG. 4 is a diagram showing correlation curves with the ordinate and the abscissa representing the CN ratio (dB) and the Mn addition rate (atomic %) in the Ag-Mn reflective film system, respectively, which are illustrative of the above-mentioned relationship between the CN ration and the Mn addition rate. Also in FIG. 2, the characters representing the thickness of reflective film are affixed to the respective curves just like in FIG. 3.

As can be understood from FIG. 4, in the case of the samples having a reflective film made of Ag alone (Mn addition rate: 0 atomic %), the CN ratio was about 48.0 dB irrespective of the thickness of the reflective film. No substantial decrease in CN ratio with increasing Mn addition rate was recognized in the range of Mn addition rate of 0 atomic % to about 7 atomic % (corresponding to a reflective film having a composition represented by the formula $Ag_{93}Mn_7$) with the above-mentioned CN ratio of about 48.0 dB being maintained. It can be understood from FIG. 4 that the CN ratio was gradually lowered as the Mn addition rate was further increased beyond the above-mentioned Mn addition rate of about 7 atomic %. The smaller the reflective film thickness, the stronger the lowering tendency of the CN ratio. In the case of recording media produced at an Mn addition rate of 45 atomic % (corresponding to a reflective film having a composition represented by the formula $Ag_{55}Mn_{45}$), the CN ratio was about 44.0 dB for a reflective film thickness of 400 Å (see the curve a), about 43.0 dB for a reflective film thickness of 300 Å (see the curve b), and about 39 dB for a reflective film thickness of 200 Å (see the curve c).

A description will now be made of the preferable range of Mn addition rate in the Ag-Mn reflective film system in accordance with the first embodiment of the present invention, while referring to FIGS. 3 and 4.

The following will be understood from the results shown in the two diagrams of FIGS. 3 and 4. The relationship between the Mn addition rate and the recording power differs depending on the thickness of reflective film. At a reflective film thickness of 400 Å, the recording power can be decreased by increasing the Mn addition rate. In contrast, when the thickness of a reflective film is 300 Å or smaller, an increase in the Mn addition rate deteriorates the reflection characteristics of the reflective film to increase light transmission therethrough to rather lower the CN ratio and increase the recording power.

It will be understood from the foregoing findings that the lower limit of the preferable range of Mn addition rate can be determined from the results of the measurement of the recording powers, while the upper limit of the above-mentioned range can be determined from the results of the measurement of the CN ratios.

First, the recording power can be decreased by increasing the Mn addition rate a relatively low range thereof as will be understandable from the curves shown in FIG. 3. When attention in focused on the gradients of the curves, it will be understood that the gradients of the curves begin to be gradually gentler at an Mn addition rate of about 3.5 atomic %. Accordingly, the lower limit of the Mn addition rate in the Ag-Mn reflective film system is suitably 2 atomic %.

As for the CN ratio, it is required according to the international standard of ISO (International Organization for Standardization) that the CN ratio as measures when writing is being done at 1,800 r.p.m. at a frequency 3.7 MHz should be at least 45 dB. Accordingly, it will be understood from FIG. 4 that the above-mentioned standard can be satisfied when the Mn addition rate is 32 atomic % or lower.

As will be understood from the foregoing description, the Mn addition rate in the Ag-Mn reflective film system is preferably in the range of 2 atomic % to 32 atomic % in order to obtain a reflective film capable of providing a magneto-optical recording medium not only having a practical readout sensitivity but also adapted to writing with a smaller recording power than a recording medium having a reflective film made of silver alone.

EXAMPLE 2

In Example 2, a description will be made of the results of measurement of the recording powers and ratios of samples having respective films of silver (Ag), manganese (Mn) and tin (Sn) at varied Mn addition rates and at varied Sn addition rates. The production of the samples as recording media and the measurement of the characteristics of the samples were conducted under substantially the same conditions as in Example 1. Therefore, only the results of measurement will be described by reference to FIG. 5(a), 5(b), 6(a) and 6(b), while avoiding any duplicated description. A plurality of recording media having respective Ag-Mn-Sn reflective films formed at varied Mn addition rates and at varied Sn addition rates were produced by varying the Sn addition rate at each of fixed Mn addition rates. In this Example, recording media having a reflective film of 400 Å in thickness and recording media having a reflective film of 200 Å in thickness were produced and examined with respect to recording power and CN ratio.

FIG. 5(a) and 5(b) are diagrams showing correlation curves with the ordinate and the abscissa representing the recording power (mW) and the Sn addition rate (atomic %), respectively, which are both illustrative of the relationship of the recording power with the Mn addition rate and the Sn addition rate in the Ag-Mn-Sn reflective film system. FIG. 5(a) is a diagram showing corresponding curves illustrating the results of measurement of the recording powers of recording media having a reflective film of 400 Å in thickness, while FIG. 5(b) is a diagram showing correlation curves illustrating the results of measurement of the recording powers of recording media having a reflective film of 200 Å in thickness. In FIGS. 5(a) and 5(b), the respective curves I illustrate the results of measurement of the recording powers of samples having respective reflective films formed by varying the Ag-Sn composition without addition of Mn for comparison with those of samples according to the second embodiment of the present invention, while the curves II, III, IV and V illustrate the results of measurement of the recording powers of samples having respective reflective films formed by varing the Sn addition rate within the range of 0 to 35 atomic % while fixing the Mn addition rate at 1, 7, 15 and 30 atomic %, respectively. In order to facilitate the understanding of the description concerning these curves, generic formulae indicating the compositions of the reflective films of samples are affixed to the curves. Specifically, "$Ag_{100-x}Sn_x$" is affixed to the curve I, "$Ag_{99-x}MnSn_x$" to the curve II, "$Ag_{93-x}Mn_7Sn_x$" to the curve III, "$Ag_{85-x}Mn_{15}Sn_x$" to the curve IV, and "$Ag_{70-x}Mn_{30}Sn_x$" to the curve V. In the above-mentioned formulae, $x > 0$.

In samples having a reflective film of 400 Å in thickness, the extent of lowering the recording power by addition of even 1 atomic % Mn and Sn to Ag was larger than that achieved by addition of only Sn to Ag as will be understood when the curve II is compared with the curve I in FIG. 5(a). Further, when the curves III to V are compared with the curve I in FIG. 5(a), it can be understood that, in every case where the Sn addition rate was fixed in recording media, the recording power was smaller as the Mn addition rate was higher.

Specific values of recording powers will now be exemplified to show the relationship between the recording power and the composition of reflective film, which is demonstrated by the curves I to V in FIG. 5(a).

When comparison in recording power is made between samples having a reflective film formed at an Sn addition rate of 1 atomic %, the recording power was about 7.6 mW for a recording medium plotted on the curve I (composition of reflective film: $Ag_{99}Sn$), about 5.7 mW for a recording medium on the curve II (composition of reflective film $Ag_{98}MnSn$), about 5.0 mW for a recording medium on the curve III (composition of reflective film: $Ag_{92}Mn_7Sn$), about 4.3 mW for a recording medium on the curve IV (composition of reflective film $Ag_{84}Mn_{15}Sn$), and about 4.0 mW for a recording medium on the curve V (composition of reflective film: $Ag_{69}Mn_{30}Sn$).

When comparison in recording power is made between samples having a reflective film formed at an Sn addition rate of 35 atomic % as the upper limit of Sn addition rate in the sample subjected to the measurement of recording power in this Example 2, the recording power was about 5.5 mW for a recording medium plotted on the curve I (composition of reflective film: $Ag_{65}Sn_{35}$), about 4.1 mW for a recording medium on the curve II (composition of reflective film: $Ag_{64}MnSn_{35}$), about 3.8 mW for a recording medium on the curve III (composition of reflective film:

$Ag_{58}Mn_7Sn_{35}$), about 3.6 mW for a recording medium on the curve IV (composition of reflective film: $Ag_{50}Mn_{15}Sn_{35}$), and about 3.3 mW for a recording medium on the curve V (composition of reflective film: $Ag_{35}Mn_{30}Sn_{35}$). Additionally stated, when the Mn addition rate was further increased beyond 30 atomic % mentioned above, the recording power could be lowered in every case where the Sn addition rate was fixed in recording media. As will be understandable from the curves II to V shown in FIG. 5(a), however, it is recognized that the extent of lowering the recording power by increasing the Sn addition rate tended to be smaller as the proportion of Mn (Mn addition rate) in the Ag-Mn-Sn reflective film system was higher.

In samples having a reflective film of 200 Å in thickness as well, the extent of lowering the recording power by addition of Sn to Ag and 1 atomic % Mn was larger than that achieved by addition of Sn to Ag alone as will be understood when the curve II is compared with the curve I in FIG. 5(b). Further, when the curves III to V are compared with the curve I in FIG. 5(b), it can be understood that the recording power complicatedly varied depending on both the Mn addition rate and the Sn addition rate in the case of the sample having a thin reflective film of 200 Å in thickness.

Specific values of recording powers will now be exemplified to show the relationship between the recording power and the composition of reflective film, which is demonstrated by the curve I to V in FIG. 5(b).

When comparison in recording power is made between samples having a reflective film formed at an Sn addition rate of 1 atomic %, the recording power was about 5.6 mW for a recording medium plotted on the curve I (composition of reflective film: $Ag_{99}Sn$), about 4.4 mW for a recording medium on the curve II (composition of reflective film: $Ag_{98}MnSn$), about 3.4 mW for a recording medium on the curve III (composition of reflective film: $Ag_{92}Mn_7Sn$), about 2.9 mW for a recording medium on the curve IV (composition of reflective film: $Ag_{84}Mn_{15}Sn$), and about 3.5 mW for a recording medium on the curve V (composition of reflective film: $Ag_{69}Mn_{30}Sn$). As can be seen In FIG. 5(b), an increase in Sn addition rate could reduce the recording power irrespective of Mn addition rate within a comparatively low range of Sn addition rate, while the recording power turned out to show an increasing tendency when the Sn addition rate was increased beyond the above-mentioned comparatively low range. The reason for this is believed to be that transmission through a reflective film is enhanced in keeping with an increase in Sn addition rate because of the small reflective film thickness of about 200 Å, so that a recording power used in information writing may not be efficiently utilized.

In recording media having an Ag-Mn-Sn reflective film, it can also be understood that the Sn addition rate at which the recording power turned off to an increasing trend was lower as the Mn addition rate was higher.

Next, a description will be made of the relationship of the CN ratio with the Mn addition rate and the Sn addition rate as regards the recording media of Example 2 while referring to FIGS. 6(a) and 6(b).

Figure 6A:
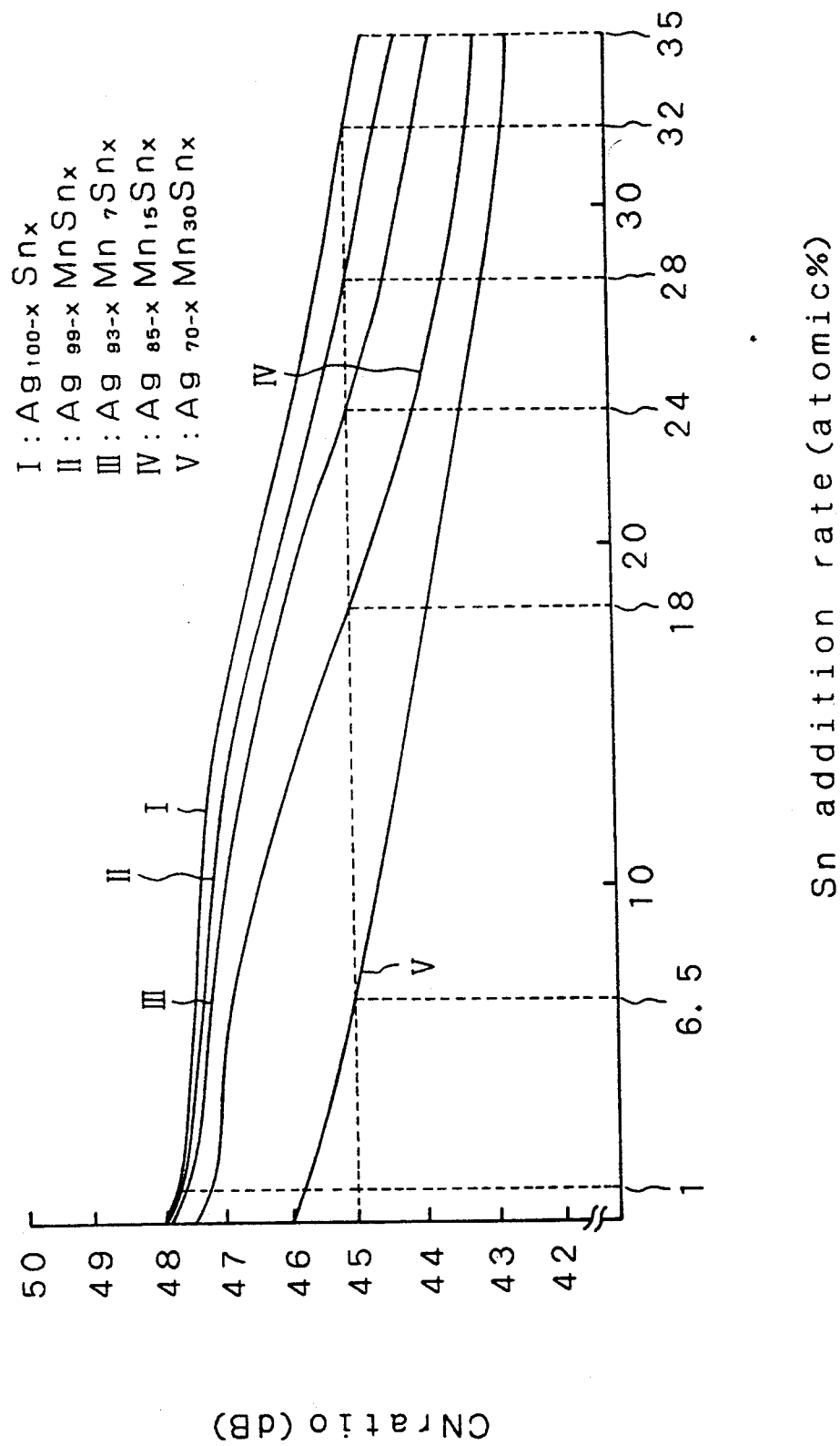

FIGS. 6(a) and 6(b) are diagrams showing correlation curves with the ordinate and the abscissa representing the CN ratio (dB) and the Sn addition rate (atomic %), respectively, which are illustrative of the relationship of the CN ratio with the Mn addition rate and the Sn addition rate as regards the recording media of Example 2. FIG. 6(a) shows the results in the case where the reflective film thickness was 400 Å, while FIG. 6(b) shows the results in the case where the reflective film thickness was 200 Å. Characters I to V as well as the generic composition formulae of the reflective films of recording media are affixed to the curve in FIGS. 6(a) and 6(b) in the same manner as in FIG. 5(a) and 5(b).

First, recording media having a comparatively thick reflective film of 400 Å in thickness made of Ag and Mn and/or Sn added thereto were all lower in CN ratio than a recording media having a reflective film of 400 Å in thickness made of Ag alone as can be understood from the curves I to V shown in FIG. 6(a). The Sn addition rate at which the CN ratio was lowered to 45 dB which is aforementioned international standard of ISO was about 32 atomic % for recording media produced without addition of Mn (curve I), about 28 atomic % for recording media produced with addition of 1 atomic % Mn (curve II), and about 24 atomic % for recording media produced with addition of 7 atomic % Mn (curve III), about 18 atomic % for recording media produced with addition of 15 atomic % Mn (curve IV), and about 6.5 atomic % for recording media produced with addition of 30 atomic % Mn (curve V).

Next, recording media having a comparatively thin reflective film of 200 Å in thickness made of Ag and Mn and/or Sn added thereto were also all lower in CN ratio than a recording medium having a reflective film of 400 Å in thickness made of Ag alone as can be understood from the curves I to V shown in FIG. 6(b). The Sn addition rate at which the CN ratio was lowered to 45 dB as mentioned above was about 27 atomic % for recording media produced without addition of Mn (curve I), about 23 atomic % for recording media produced with addition of 1 atomic % Mn (curve II), about 20 atomic % for recording media produced with addition of 7 atomic % Mn (curve III), about 14 atomic % for recording media produced with addition of 15 atomic % Mn (curve IV), and about 3 atomic % for recording media produced with addition of 30 atomic % Mn (curve V).

As can be understood from comparison between FIGS. 5(a) and 5(b) as well as between FIGS. 6(a) and 6(b), a thinner reflective film provides a lower CN ratio than a thicker reflective film having the same composition. Accordingly, in forming an Ag-Mn-Sn reflective film capable of giving a practicable CN ratio and a decreased recording power to a recording medium, it is necessary to determine narrower preferable ranges of Mn addition rate and Sn addition rate using as yardsticks the results obtained in the case of a small reflective film thickness.

A description will now be made of the preferable ranges of Mn addition rate and Sn addition rate in the Ag-Mn-Sn reflective film of the recording medium according to the second embodiment of the present invention while referring to FIGS. 5(b) and 6(b).

First, the preferable range of Mn addition rate will be described.

As will be understandable from comparison of the curve I with the curves II to V in FIG. 5(b), addition of Mn and Sn to Ag at an Mn addition rate of at least 1 atomic % can provide a sufficient effect of decreasing power as compared with addition of only Sn to Ag.

On the other hand, when attention is focused on the range of Sn addition rate wherein a CN ratio of at least 45 dB can be attained in FIG. 6(b), the lowering of CN ratio is relatively gentle within the range of Sn addition rate of about 3 atomic % to about 7 atomic % in the curve IV (Mn addition rate 15 atomic %). This tendency can be recognized in the curve II (Mn addition rate: 1 atomic %) and the curve III (Mn addition rate: 7 atomic %) as well. In contrast, in the curve V (Mn addition rate: 30 atomic %), a continuous lowering tendency is seen over the whole range of Sn addition rate within which the measurement of CN ratio was made. This will make it understandable that the Mn addition rate is preferably in the range of addition rate 15 atomic % or lower.

As described above, it can be understood from the viewpoint of the lowering of the CN ratio and the effect of reducing the recording power that the preferable range of Mn addition rate may be set to be from 1 atomic % to 15 atomic %.

Next, the preferable range of Sn addition rate will be described.

As will be understandable from FIG. 5(b), when the Sn addition rate is set to be 1 atomic % or higher, a 20% or more reduction of recording power from a recording power of about 5.7 mW for a recording medium having a reflective film made of Ag alone can be realized at all of the Mn addition rate as represented by the curves II to V.

As already described by reference to the results of measurement of CN ratio as shown in FIG. 6(b), the upper limit of Sn addition rate may be set so as to satisfy the CN ratio of 45 dB as the practically sufficient value stipulated in the international standard.

Accordingly, the preferable composition range of Ag-Mn-Sn reflective film on the basis of the results of measurement in Example 2 in accordance with the second embodiment of the present invention is such that:

(1) in the case of a reflective film represented by the composition formula: $Ag_{99-x}MnSn_x$, the Sn addition rate is in the range of 1 atomic % to 23 atomic % based on the results shown by the curve II;

(2) in the case of a reflective film represented by the composition formula: $Ag_{93-x}Mn_7Sn_x$, the Sn addition rate is in the range of 1 atomic % to 20 atomic % based on the results shown by the curve III; and (3) in the case of a reflective film represented by the composition formula: $Ag_{85-x}Mn_{15}Sn_x$, the Sn addition rate is in the range of 1 atomic % to 14 atomic % based on the results shown by the curve IV.

EXAMPLE 3

In Example 3, magneto-optical recording media having a laminated structure as shown in FIG. 1(a) and different from that of the foregoing recording media of Examples 1 and 2 were produced to measure the recording powers and CN ratios thereof. The laminated structure of the magneto-optical recording media of this Example is shown in FIG. 2(b).

A description will be made of the thickness and materials of constitutional layers of a recording medium. A protective film 113a made of silicon aluminum nitride (AlSiN) and having a thickness of 700 Å, a magnetic film 115 made of aforementioned Tb-Fe-Co alloy and having a thickness of 300 Å, and a protective film 113b made of the above-mentioned AlSiN and having a thickness of 1,000 Å were sequentially deposited on the upper surface of a substrate 111 made of polycarbonate.

Thereafter, a reflective film 117 having a thickness of 400 Å or 200 Å and a composition represented by the formula: $Ag_{86}Mn_7Sn_7$, which is one example of the composition of the Ag-Mn-Sn reflective film in accordance with the second embodiment of the present invention, was deposited on the surface of the protective film 113b to produce a magneto-optical recording medium 119 of Example 3.

The deposition of the constitutional layers including the protective layers was done under substantially the same conditions as in Examples 1 and 2.

Comparative recording media were produced in substantially the same manner as described above except for use of only Ag in the reflective films thereof.

The foregoing two kinds of recording media were examined with respect to recording power and CN ratio under the aforementioned numerical conditions according to the aforementioned procedures.

As a result, a recording power of 8 mW and a CN ratio of 50.4 dB were obtained for a comparative recording medium having a reflective film of 400 Å in thickness, while a recording power of 5.7 mW and a CN ratio of 50.2 dB were obtained for a comparative recording medium having a reflective film of 200 Å in thickness.

In contrast, a recording power of 4.5 mW and a CN ratio of 50.1 dB, which is on substantially the same level as those of the comparative recording media, were obtained for a recording medium of Example 3 having a reflective film of 400 Å in thickness, while a recording power of 3.1 mW and a CN ratio of 50.0 dB were obtained for a recording medium of Example 3 having a reflective film of 200 Å in thickness.

As will be understandable from the foregoing results, an improvement in CN ratio due to Kerr effect enhancement can be realized without lowering the recording sensitivity by changing the position of the reflective film of either a recording medium of Example 2 according to the present invention or a conventional recording medium.

Other Examples

While the magneto-optical recording medium of the present invention has been described in the foregoing Examples while taking as examples the structures thereof comprising the protective film 113a provided between the substrate 111 and the magnetic film 115 and the another protective film 113b provided between the magnetic film 115 and the reflective film 117 or on the upper side of the reflective film 117 as shown in FIGS. 2(a) and 2(b), the present invention should not be construed as being limited to the above-mentioned structures of these Examples.

For example, the magneto-optical recording medium of the present invention may have a laminated structure comprising a magnetic film 115 and a reflective film 117 sequentially deposited directly on a substrate 111 without a protective film 113a and/or 113b between the substrate 111 and the magnetic film 115 and/or between magnetic film 115 and the reflective film 117. The magneto-optical recording medium in this case is designated by reference numeral 123 in FIG. 7. Additionally stated, the substrate 111, the magnetic film 115 and the reflective film 117 constituting the magneto-optical medium of FIG. 7 may be formed from the same materials as used in either of the structures of FIGS. 2(a) and 2(b) in any of the foregoing Examples in the same manner as in any of the foregoing Examples. The magneto-optical recording medium of FIG. 7 can also be expected to have preferable recording power and CN ratio characteristics similar to those of the magneto-optical recording media of FIGS. 2(a) and 2(b).

While the Examples of the present invention have been described in detail, it will be apparent to those skilled in the art that the present invention is not limited to the foregoing Examples.

For example, the substrate, magnetic film and protective films of each magneto-optical recording medium in the foregoing Examples have been described with exemplification of materials, thicknesses and other specific conditions. However, the effects of the present invention are not supposed to be secured only when those conditions are respectively used.

While the recording medium having the respective specific reflective film compositions were produced as examples of the first and second embodiments of the present invention and the preferable ranges of reflective film composition were described, it will be apparent to those skilled in the art that the effects of the present invention are not supposed to be secured only when the reflective film composition is within either of the above-mentioned preferable ranges. For example, in Example 2, the specific Mn addition rates were exemplified to examine into the preferable ranges of Sn addition rate at the respective specific Mn addition rates for the purpose of facilitating the understanding of the description. However, the effects of the present invention are not supposed to be secured only when the Mn addition rate and the Sn addition rate are within the respective exemplified preferable ranges. Similar effects can also be expected in the case of recording media produced by arbitrarily and suitably choosing a reflective film composition varied away from the exemplified ranges.

While the specific thickness of reflective films were exemplified in the foregoing description of Examples, the present invention is not limited to the exemplified specific thicknesses of reflective films Although detailed data are omitted here, it was found through an experiment made by the authors of the present invention that it is difficult to achieve a favorable recording power in the case of a reflective film having a thickness of 500 Å because heat available for information writing in a magnetic film dissipates away therefrom through the reflective film, while a decrease in CN ratio and an increase in recording power are conspicuous in the case of a reflective film having a thickness of 100 Å because the reflective film itself is increased in transmission to fail to provide an effective Kerr enhancement effect Accordingly, in embodying the present invention, a magneto-optical recording medium having a good recording sensitivity can be materialized when the thickness of the reflective film thereof is set to be in the range of about 200 Å to about 400 Å.

While the reflective films of the magneto-optical recording media of the foregoing Examples are made of silver and manganese or of silver, manganese and tin, the present invention is not limited to only these materials in forming a reflective film. Incorporation of an additional material(s) other than tin into a reflective film comprising silver and manganese, or incorporation of an additional material(s) into a reflective film comprising silver, manganese and tin is expected to provide effects similar to those attained in the foregoing Examples.

It will be apparent to those skill in the art that the materials and thicknesses of films, the positional relationship therebetween, the numerical and other specific conditions are capable of modification and alternation within the purview of the object of the present invention in accordance with arbitrary and suitable designing.

As will be apparent from the foregoing description, a reflective film is formed of silver (Ag) and manganese (Mn) in a magneto-optical recording medium according to the first embodiment of the present invention to utilize the high reflection factor of Ag while at the same time lowering the thermal conductivity of the reflective film by addition of Mn to Ag.

As will be apparent from the foregoing description, a reflective film is formed of three elements, silver (Ag), manganese (Mn) and tin (Sn), in a magneto-optical recording medium according to the second embodiment of the present invention to utilize the high reflection factor of Ag just like in the first embodiment while at the same time lowering the thermal conductivity of the reflective film by addition of Mn and Sn to Ag.

Thus, according to either of the first and second embodiments of the present invention, there can be provided an excellent magneto-optical recording medium reduced in recording power by realizing a low thermal conductivity in the reflective film thereof while keeping the CN ratio thereof at a practically sufficient level.

What is claimed is:

1. A magneto-optical recording medium comprising a substrate, a magneto-optical film for recording by selectively lowering its coercive force with a laser beam and a reflective film having a lower thermal conductivity to reduce heat dissipation when recording information on said magneto-optical film, thereby reducing the amount of power required to record information on said magneto-optical film, said reflective film consisting essentially of silver and manganese.

2. A magneto-optical recording medium as claimed in claim 1, wherein the amount of silver based on the total amount of silver and manganese is in the range of 2 atomic % to 32 atomic %.

3. A magneto-optical recording medium as claimed in claim 1, which further comprises a first protective film provided between said substrate and said magneto-optical film, and a second protective film provided between said magneto-optical film and said reflective film.

4. A magneto-optical recording medium as claimed in claim 1, which further comprises a first protective film provided between said substrate and said magneto-optical film, and a second protective film provided on said reflective film which is provided on said magneto-optical film.

5. A magneto-optical recording medium as claimed in claim 1, wherein the thickness of said reflective film is in the range of 200 Å to 400 Å.

6. A magneto-optical recording medium comprising a substrate, a magneto-optical film for recording by selectively lowering its coercive force with a laser beam and a reflective film having a lower thermal conductivity to reduce heat dissipation when recording information on said magneto-optical film, thereby reducing the amount of power required to record information on said magneto-optical film, wherein said reflective film consists essentially of silver, manganese and tin.

7. A magneto-optical recording medium as claimed in claim 6, wherein the amount of manganese based on the total amount of silver, manganese and tin is 1 atomic % while the amount of tin based on the total amount of silver, manganese and tin is in the range of 1 atomic % to 23 atomic %.

8. A magneto-optical recording medium as claimed in claim 6, wherein the amount of manganese based on the total amount of silver, manganese and tin is 7 atomic % while the amount of tin based on the total amount of silver, manganese and tin is in the range of 1 atomic % to 20 atomic %.

9. A magneto-optical recording medium as claimed in claim 6, wherein the amount of manganese based on the total amount of silver, manganese and tin is 15 atomic % while the amount of tin based on the total amount of silver, manganese and tin is in the range of 1 atomic % to 14 atomic %.

10. A magneto-optical recording medium as claimed in claim 6, which further comprises a first protective film provided between said substrate and said magneto-optical film, and a second protective film provided between said magneto-optical film and said reflective film.

11. A magneto-optical recording medium as claimed in claim 6, which further comprises a first protective film provided between said substrate and said magneto-optical film, and a second protective film provided on said reflective film which is provided on said magneto-optical film.

12. A magneto-optical recording medium as claimed in claim 6, the thickness of said reflective film is in the range of 200 Å to 400 Å.

13. A magneto-optical recording medium comprising a substrate, a magneto-optical film over said substrate for recording by selectively lowering its coercive force with a laser beam and a reflective film over said magneto-optical film consisting essentially of silver and manganese, wherein the amount of silver based on the total amount of silver and manganese is in the range of 2 atomic % to 32 atomic %, said reflective film capable of providing a high CN ratio and reducing the recording power of said magneto-optical recording film.

14. A magneto-optical recording medium as claimed in claim 13, which further comprises a first protective film provided between said substrate and said magneto-optical film, and a second protective film provided between said magneto-optical film and said reflective film.

15. A magneto-optical recording medium as claimed in claim 13, which further comprises a first protective film provided between said substrate and said magneto-optical film, and a second protective film provided on said reflective film.

16. A magneto-optical recording medium comprising a substrate, a magneto-optical film over said substrate for recording by selectively lowering its coercive force with a laser beam and a reflective film over said magneto-optical film consisting essentially of silver, manganese and tin in amounts sufficient to provide a high CN ratio and sufficient to enable the recording power of the magneto-optical film to be reduced.

17. A magneto-optical recording medium as claimed in claim 16, wherein the amount of manganese based on the total amount of silver, manganese and tin is 1 atomic % while the amount of tin based on the total amount of silver, manganese and tin is in the range of 1 atomic % to 23 atomic %.

18. A magneto-optical recording medium as claimed in claim 16, wherein the amount of manganese based on the total amount of silver, manganese and tin in 7 atomic % while the amount of tin based on the total amount of silver, manganese and tin is in the range of 1 atomic % to 20 atomic %.

19. A magneto-optical recording medium as claimed in claim 16, wherein the amount of manganese based on the total amount of silver, manganese and tin is 15 atomic % while the amount of tin based on the total amount of silver, manganese and tin is in the range of 1 atomic % to 14 atomic %.

20. A magneto-optical recording medium as claimed in claim 16, which further comprises a first protective film provided between said substrate and said magneto-optical film, and a second protective film provided between said magneto-optical film and said reflective film.

21. A magneto-optical recording medium as claimed in claim 16, which further comprises a first protective film provided between said substrate and said magneto-optical film, and a second protective film provided on said reflective film.

* * * * *